US012083789B2

(12) United States Patent
Ishihara et al.

(10) Patent No.: US 12,083,789 B2
(45) Date of Patent: Sep. 10, 2024

(54) ATTACHMENT MECHANISM, APPARATUS INCLUDING ATTACHMENT MECHANISM, BELT DEVICE, CONVEYANCE DEVICE, COOLING DEVICE, AND PRINTING APPARATUS

(71) Applicants: Hiroki Ishihara, Kanagawa (JP); Takehiro Nakamura, Ibaraki (JP); Kenji Nozawa, Ibaraki (JP)

(72) Inventors: Hiroki Ishihara, Kanagawa (JP); Takehiro Nakamura, Ibaraki (JP); Kenji Nozawa, Ibaraki (JP)

(73) Assignee: Ricoh Company, Ltd., Tokyo (JP)

( * ) Notice: Subject to any disclaimer, the term of this patent is extended or adjusted under 35 U.S.C. 154(b) by 407 days.

(21) Appl. No.: 17/412,487

(22) Filed: Aug. 26, 2021

(65) Prior Publication Data

US 2022/0073295 A1 Mar. 10, 2022

(30) Foreign Application Priority Data

Sep. 4, 2020 (JP) ................................ 2020-149428
Jul. 6, 2021 (JP) ................................ 2021-112168

(51) Int. Cl.
*B41J 11/00* (2006.01)

(52) U.S. Cl.
CPC ..... *B41J 11/007* (2013.01); *B65H 2301/5144* (2013.01); *B65H 2404/255* (2013.01); *B65H 2404/2614* (2013.01)

(58) Field of Classification Search
CPC .......... B65H 2404/255; B65H 2402/30; B65H 2404/144; B65H 2404/253; B65H 2404/25; B41J 41/007
See application file for complete search history.

(56) References Cited

U.S. PATENT DOCUMENTS

| | | | | |
|---|---|---|---|---|
| 9,535,374 | B1 * | 1/2017 | Embry | G03G 15/161 |
| 9,636,930 | B1 * | 5/2017 | Leighton | B65H 5/085 |
| 10,001,730 | B1 * | 6/2018 | Gould, II | G03G 15/161 |
| 10,059,544 | B2 * | 8/2018 | Ito | B41J 11/007 |
| 2015/0075207 | A1 | 3/2015 | Karikusa et al. | |
| 2017/0129725 | A1 * | 5/2017 | Sasaki | B65H 5/068 |
| 2019/0202215 | A1 | 7/2019 | Asada et al. | |
| 2019/0204767 | A1 | 7/2019 | Ishihara et al. | |
| 2020/0290383 | A1 | 9/2020 | Ishihara et al. | |

FOREIGN PATENT DOCUMENTS

| | | |
|---|---|---|
| JP | 2008-069004 | 3/2008 |
| JP | 2008-107644 | 5/2008 |
| JP | 2008-308249 | 12/2008 |

(Continued)

*Primary Examiner* — Patrick Cicchino
(74) *Attorney, Agent, or Firm* — Harness, Dickey & Pierce, P.L.C.

(57) ABSTRACT

An attachment mechanism includes a first holding member and a second holding member. The first holding member is configured to hold a device side plate of a belt device to attach a main body side plate of an apparatus in which the belt device is incorporated. The second holding member is configured to be fixed to the first holding member. The first holding member and the second folding member are configured to adjust a posture of the device side plate with respect to the main body side plate in assembly of the belt device.

11 Claims, 10 Drawing Sheets

(56) References Cited

FOREIGN PATENT DOCUMENTS

| | | |
|---|---|---|
| JP | 2009-184767 | 8/2009 |
| JP | 2011-121711 | 6/2011 |
| JP | 2011-141314 | 7/2011 |
| JP | 2012-053149 | 3/2012 |
| JP | 2015-014313 | 1/2015 |
| JP | 2015-059985 | 3/2015 |
| JP | 2020-146937 | 9/2020 |

* cited by examiner

ATTACHMENT MECHANISM, APPARATUS INCLUDING ATTACHMENT MECHANISM, BELT DEVICE, CONVEYANCE DEVICE, COOLING DEVICE, AND PRINTING APPARATUS

CROSS-REFERENCE TO RELATED APPLICATIONS

This patent application is based on and claims priority pursuant to 35 U.S.C. § 119(a) to Japanese Patent Application Nos. 2020-149428, filed on Sep. 4, 2020, and 2021-112168, filed on Jul. 6, 2021, in the Japan Patent Office, the entire disclosure of each of which is hereby incorporated by reference herein.

BACKGROUND

Technical Field

Embodiments of the present disclosure relate to an attachment mechanism, an apparatus including the attachment mechanism, a belt device, a conveyance device, a cooling device, and a printing apparatus.

Related Art

Belt devices are known to include one or more endless belts each supported by a plurality of rollers. The plurality of rollers is disposed between a pair of side plates supporting both ends of the plurality of rollers. For example, a known sheet conveying device includes a cooling device disposed inside an endless belt circulation path of the belt device.

SUMMARY

Embodiments of the present disclosure described herein provide a novel attachment mechanism including a first holding member and a second holding member. The first holding member is configured to hold a device side plate of a belt device to attach a main body side plate of an apparatus in which the belt device is incorporated. The second holding member is configured to be fixed to the first holding member. The first holding member and the second folding member are configured to adjust a posture of the device side plate with respect to the main body side plate in assembly of the belt device.

Further, embodiments of the present disclosure described herein provide an apparatus including a belt device including a pair of device side plates, and the above-described attachment mechanism that is configured to attach one of the pair of device side plates of the belt device to the main body side plate of the apparatus.

Further, embodiments of the present disclosure described herein provide a belt device including an endless belt supported by a plurality of rollers, a pair of device side plates, and the above-described attachment mechanism that is configured to attach one of the pair of device side plates to a main body side plate.

Further, embodiments of the present disclosure described herein provide a conveyance device including the above-described belt device that is configured to convey a sheet.

Further, embodiments of the present disclosure described herein provide a cooling device including the above-described belt device, and a cooling unit disposed inside a circulation path of an endless belt of the belt device.

Further, embodiments of the present disclosure described herein provide a printing apparatus including at least one of a conveyance device configured to convey a sheet and a cooling device configured to cool the sheet. The conveyance device and the cooling device include the above-described belt device.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

Figure 1:
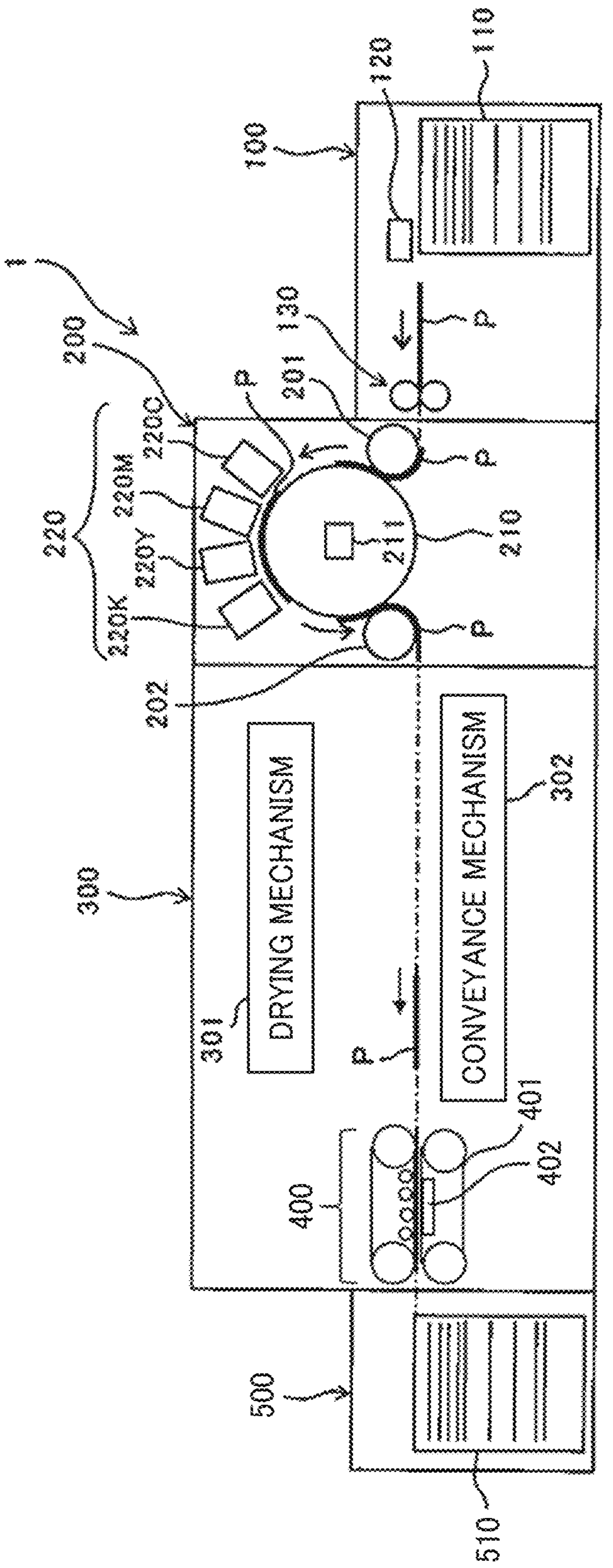
FIG. 1 is a diagram illustrating an overall configuration of a printing apparatus.

The accompanying drawings are intended to depict embodiments of the present disclosure and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this patent specification is not intended to be limited to the specific terminology so selected and it is to be understood that each specific element includes all technical equivalents that operate in a similar manner and achieve similar results.

Referring now to the drawings, embodiments of the present disclosure are described below. As used herein, the singular forms "a," "an," and "the" are intended to include the plural forms as well, unless the context clearly indicates otherwise.

FIG. 1 is a diagram illustrating an overall configuration of a printing apparatus.

Overall Description

FIG. 1 illustrates a schematic configuration of an inkjet image forming apparatus according to the present embodiment. An inkjet image forming apparatus 1 according to the present embodiment mainly includes a sheet feeder 100, an image forming device 200, a drying device 300, and a sheet ejection device 500. In the inkjet image forming apparatus 1, the image forming device 200 forms an image using ink that is an image forming liquid on a sheet P. The sheet P is a recording medium (a sheet material) fed from the sheet feeder 100. The inkjet image forming apparatus 1 ejects the sheet P to the sheet ejection device 500 after the drying device 300 dries the ink applied onto the sheet P.

Sheet Feeder

The sheet feeder 100 mainly includes a sheet feeding tray 110, a feeding device 120, and a registration roller pair 130. The sheet feeding tray 110 loads a plurality of sheets P. The feeding device 120 separates and feeds sheets P one by one from the sheet feeding tray 110. The registration roller pair 130 feeds the sheet P to the image forming device 200. The feeding device 120 may have a configuration employing a roller or a roll or a configuration employing air suction. The feeding device 120 sends out the sheet P from the sheet feeding tray 110. After the leading end of the sheet P fed from the sheet feeding tray 110 reaches the registration roller pair 130, the registration roller pair 130 is driven at a predetermined timing, to feed the sheet P to the image forming device 200. In the present embodiment, the configuration of the sheet feeder 100 is not limited to the above-described configuration but may be any particular configuration, as long as the sheet feeder 100 feeds the sheet P to the image forming device 200.

Image Forming Device

The image forming device 200 includes a sheet receiving cylinder 201 and a sheet conveyor drum 210. The sheet receiving cylinder 201 receives the sheet P and forwards the sheet P to the sheet conveyor drum 210. The sheet conveyor drum 210 conveys the sheet P fed from the sheet receiving cylinder 201 while carrying the sheet P on the outer peripheral surface of the sheet conveyor drum 210. The image forming device 200 also includes an ink discharge unit 220 and a sheet transfer cylinder 202. The ink discharge unit 220 discharges ink toward the sheet P on the sheet conveyor drum 210. The sheet transfer cylinder 202 transfers the sheet P conveyed from the sheet conveyor drum 210 to the drying device 300. The leading end of the sheet P conveyed from the sheet feeder 100 to the image forming device 200 is gripped by a sheet gripper disposed on the surface of the sheet receiving cylinder 201. The sheet gripper grips the leading end of the sheet P and conveys the sheet P as the sheet receiving cylinder 201 rotates, in other words, as the surface of the sheet receiving cylinder 201 moves. The sheet P conveyed by the sheet receiving cylinder 201 is transferred to the sheet conveyor drum 210 at a position at which the sheet receiving cylinder 201 faces the sheet conveyor drum 210.

The sheet conveyor drum 210 has a sheet gripper on the surface. The sheet gripper of the sheet conveyor drum 210 grips the leading end of the sheet P. The sheet conveyor drum 210 includes a plurality of suction holes formed dispersedly in the surface of the sheet conveyor drum 210. A suction device 211 generates a sucking-in airflow orienting inside the sheet conveyor drum 210 through each suction hole. When the sheet P is forwarded from the sheet receiving cylinder 201, the leading end of the sheet P is gripped by the sheet gripper mounted on the sheet conveyor drum 210. The sheet is attracted to the surface of the sheet conveyor drum 210 by the sucking-in airflow generated by the suction device 211 and conveyed as the sheet convevor drum 210 rotates.

The ink discharge unit 220 discharges four color inks of cyan (C), magenta (M), yellow (Y), and black (K), to form an image. The ink discharge unit 220 includes individual liquid discharge heads 220C, 220M, 220Y, and 220K for each ink. The configurations of the liquid discharge heads 220C, 220M, 220Y, and 220K are not limited to the above-described configurations and may be any other configuration suitable for liquid discharge. The ink discharge unit 220 may include a liquid discharge head that discharges a special ink such as white, gold, or silver according to the setting. Further, the ink discharge unit 220 may include a liquid discharge head that discharges a liquid that does not contribute to image formation, such as a surface coating liquid.

The discharge operations of the liquid discharge heads 220C, 220M, 220Y, and 220K of the ink discharge unit 220 are controlled by drive signals corresponding to image data. When the sheet P carried by the sheet conveyor drum 210 passes through the region facing the ink discharge unit 220, the ink discharge unit 220 discharges respective color inks from the liquid discharge heads 220C, 220M, 220Y, and 220K. As a result, the ink discharge unit 220 forms an image, on the sheet P, corresponding to the image data. In the present embodiment, the configuration of the image forming device 200 is not limited to the above-described configuration but may be any particular configuration as long as an image is formed by applying liquid onto the sheet P.

Drying Device

The drying device 300 includes a drying mechanism 301 and a conveyance mechanism 302. The drying mechanism 301 dries the ink applied to the sheet P by the image forming device 200. The conveyance mechanism 302 conveys the sheet conveyed from the image forming device 200. The sheet P conveyed from the image forming device 200 is received by the conveyance mechanism 302. The conveyance mechanism 302 conveys the received sheet so as to pass through the drying mechanism 301 and forwards the sheet to the sheet ejection device 500. The drying mechanism 301 dries the ink on the sheet P passing through the drying mechanism 301. As a result, liquid components such as moisture in the ink evaporate. As the moisture in the ink evaporates, the ink is fixed to the sheet P, and curling of the sheet P is reduced.

Cooling Device

The cooling device 400 includes conveyance belts 401 that convey a sheet and a cooling unit 402 that cools the sheet. By passing through the cooling device 400, the temperature of the sheet decreases to a temperature at which the sheet is stackable.

Sheet Ejection Device

The sheet ejection device 500 includes an output tray 510 on which a plurality of sheets is stacked. The sheet P conveyed from the drying device 300 is sequentially stacked and held on the output tray 510. In the present embodiment, the configuration of the sheet ejection device 500 is not limited to the above-described configuration but may be any particular configuration as long as the sheet P is ejected.

Other Functional Devices

The inkjet image forming apparatus 1 according to the present embodiment includes the sheet feeder 100, the image forming device 200, the drying device 300, and the sheet ejection device 500. However, any other devices may be added, accordingly. For example, the inkjet image forming apparatus 1 may include a pre-processing device between the sheet feeder 100 and the image forming device 200. The pre-processing device performs a pre-processing operation, e.g., of the sheet prior to image formation. In addition, the inkjet image forming apparatus 1 may include a post-processing device between the drying device 300 and the sheet ejection device 500. The post-processing device performs a post-processing operation after image formation.

For example, the pre-processing device applies a treatment liquid that reacts with the liquid to inhibit bleeding (a pre-coating operation), on the sheet P. However, there is no particular limitation on the content of the pre-processing operation performed by the pre-processing device. An example of the post-processing device is a sheet reverse conveyor that reverses and conveys the sheet on which an image is formed by the image forming device 200, to feed the sheet again to the image forming device 200 to perform image formation on both sides of the sheet. Examples of the post-processing device further include a mechanism to correct deformation of the sheet, and a mechanism to cool the sheet. However, there is no particular limitation on the content of the post-processing operation performed by the post-processing device.

The present embodiment employs a printing apparatus as an example of the inkjet image forming apparatus. However, the "printing apparatus" is not limited to an apparatus that includes a liquid discharge head that discharges liquid to a face to be dried of a sheet and visualizes a meaningful image, such as a character or a drawing, with the discharged liquid. For example, the "printing apparatus" may include an apparatus to form meaningless images, such as meaningless patterns. The material of the sheet material is not limited to a specific material. Examples of the material of the sheet include any materials on which liquid can be adhered even temporarily, such as sheet, thread, fiber, fabric, leather, metal, plastic, glass, wood, and ceramic. For example, the sheet can be made of a material used for film products, cloth products such as clothing, building materials such as wallpaper and flooring, and leather products. The "printing apparatus" may also include devices to feed, convey, and eject the material onto which liquid adheres. The "printing apparatus" may further include a pre-processing apparatus to apply treatment liquid to the material before liquid is discharged onto the material and a post-processing apparatus to apply treatment liquid to the material after liquid is discharged onto the material.

Further, "liquid" discharged from the head is not particularly limited as long as the liquid has a viscosity and surface tension of degrees dischargeable from the head. However, preferably, the viscosity of the liquid is not greater than 30 mPa s under ordinary temperature and ordinary pressure or by heating or cooling. More specifically, examples of the liquid include a solution, a suspension, or an emulsion that contains, for example, a solvent, such as water or an organic solvent, a colorant, such as dye or pigment, a functional material, such as a polymerizable compound, a resin, or a surfactant, a biocompatible material, such as deoxyribonucleic acid (DNA), amino acid, protein, or calcium, or an edible material, such as a natural colorant. These "liquids" may be used, for example, as inkjet ink and surface treatment liquid.

The "printing apparatus" may be an apparatus in which a liquid discharge head and the sheet P move relatively to each other. However, the "printing apparatus" is not limited to such an apparatus. For example, the printing apparatus may be a serial head apparatus that moves the liquid discharge head or a line head apparatus that does not move the liquid discharge head.

The liquid discharge head is a functional component to discharge or jet liquid from discharge nozzles. For the energy source for generating energy for discharging the liquid, a discharge energy generator such as a piezoelectric actuator, a thermal actuator, and an electrostatic actuator may be used. Examples of the piezoelectric actuator include a laminated piezoelectric element and a thin-film piezoelectric element. The thermal actuator uses an electrothermal transducer element such as a heat element. The electrostatic actuator includes a diaphragm and opposed electrodes. The discharge energy generator to be used is not limited.

Figure 2:
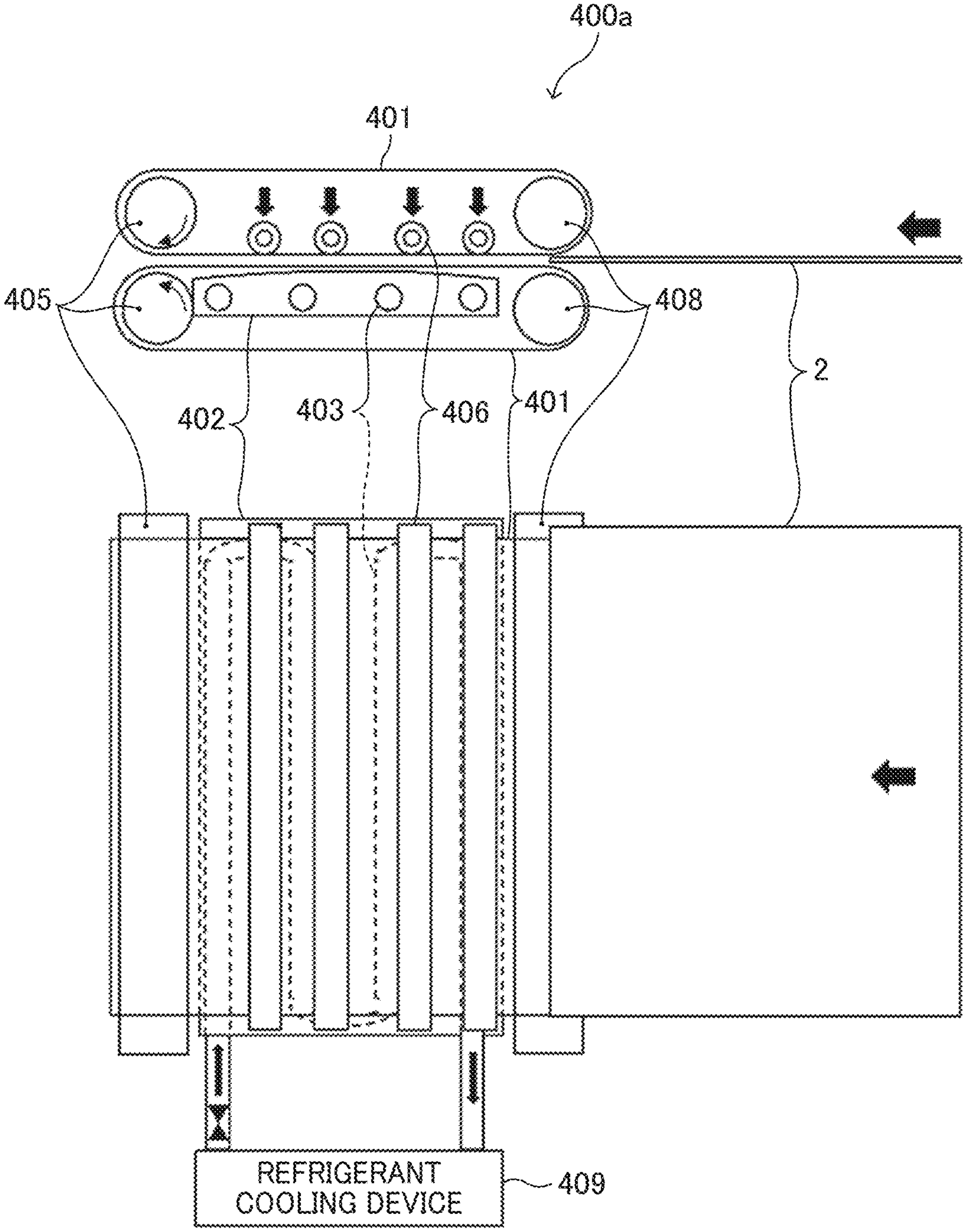
FIG. 2 is a schematic view of a configuration of a sheet cooling device including a cooling unit, included in the printing apparatus of FIG. 1.

FIG. 2 is a schematic view of a configuration of a sheet cooling device including a cooling unit 402.

The sheet cooling device illustrated in FIG. 2 functions as a sheet conveyance mechanism and includes the conveyance belts 401, each of which is an endless belt for conveying the sheet 2, and driven rollers 408 and driving rollers 405. The driven rollers 408 and the driving rollers 405 function as a plurality of supporting rollers supporting the conveyance belts 401. The sheet cooling device further includes a cooling unit 402 and pressure rollers 406. Each of the pressure rollers 406 presses the sheet 2 against the cooling unit 402.

The cooling unit 402 is disposed inside the loop of one of the conveyance belts 401 so as to contact the back side of the one of the conveyance belts 401. The cooling unit 402 includes coolant pipes 403 through which a coolant (as refrigerant) flows. The coolant pipes 403 are connected to a refrigerant cooling device 409 via a tube, and a coolant is flowed by a pump. In the present embodiment, the conveyance belts 401, the driving rollers 405, the driven rollers 408, and the cooling unit 402 in the sheet cooling apparatus form a module.

Figure 3A:
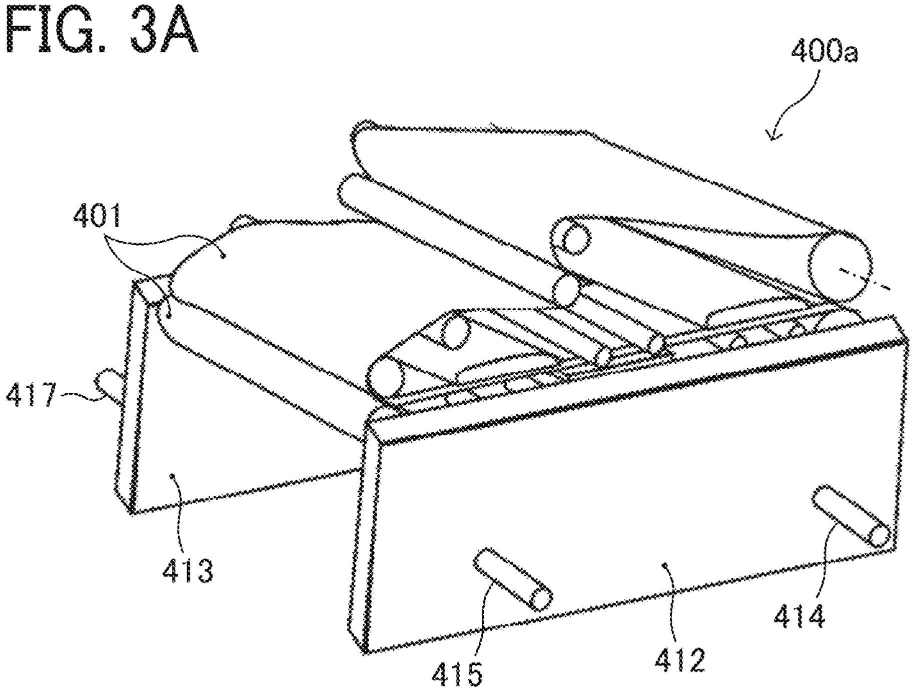
FIG. 3A is a diagram illustrating a configuration of a belt module.
Figure 3B:
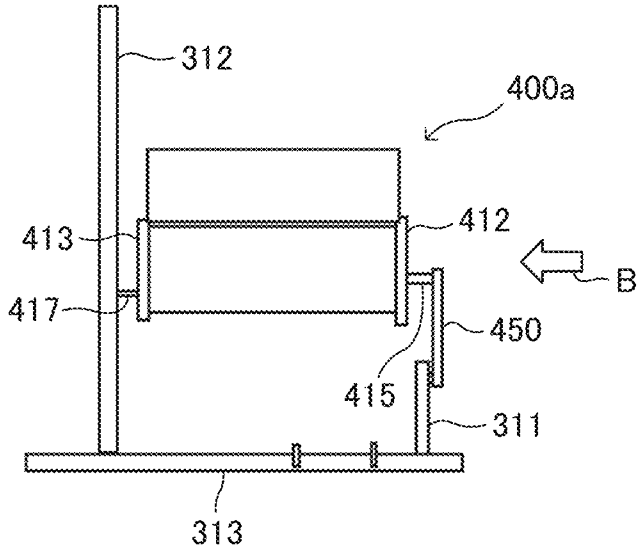
FIG. 3B is a diagram illustrating a configuration of a device including the belt module of FIG. 3A.

FIGS. 3A and 3B are diagrams of a belt module 400*a*.

FIG. 3A is a perspective view of the belt module 400*a* alone.

FIG. 3B is a left side view of the belt module 400*a* assembled with a housing of the drying device 300.

The belt device illustrated in FIGS. 3A and 3B differs from the example illustrated in FIG. 2. Specifically, in the belt module 400*a* that functions as a belt device, one cooling device is disposed at the center in one conveyance direction inside the circulation path of the lower conveyance belt 401. Inside the circulation path of the upper conveyance belt 401, cooling devices are disposed respectively upstream and downstream of the conveyance direction. Pressure rollers are disposed at respective positions facing the cooling device of the other belt (i.e., the lower conveyance belt 401). As long as the conveyance belts 401 are wound around the rollers, the belt module 400*a* may include a single conveyance belt 401 on the lower side, for example, or two belts on the upper and lower sides as illustrated in FIGS. 3A and 3B. Alternatively, three or more belts may be used.

As illustrated in FIG. 3A, the module front plate 412 and the module rear plate 413 support both ends of the driving roller 405, the driven roller 408, and the cooling unit 402 of the lower conveyance belt 401. The positions of the driving roller 405 and the driven roller 408 of the lower conveyance belt 401 in FIG. 3A are basically identical to the positions in FIG. 2. Regarding the front side plate and the rear side plate supporting both ends of the driving roller 405, the driven roller 408, and the cooling unit 402 of the upper conveyance belt 401, a further description is given below, with reference to FIG. 8. The front side plate and the rear side plate of the upper conveyance belt 401 are separate from the module front plate 412 and the module rear plate 413 for the lower conveyance belt 401. In other words, the module of the upper conveyance belt 401 is different from the module of the lower conveyance belt 401. The upper and lower conveyance belts 401 are an integrated module to be attached to the housing of the drying device 300 via the module front plate 412 and the module rear plate 413.

The cooling unit 402 has a certain rigidity and functions as a stay between the pair of side plates such as the module front plate 412 and the module rear plate 413. In addition to the cooling device, a dedicated stay may be provided inside the lower conveyance belt 401. The attaching positions of the end portions of the pair of side plates, such as the module front plate 412 and the module rear plate 413, are adjusted so that the driving roller 405 and the driven roller 408 are parallel to each other in the assembly process of the module. The stay maintains the driving roller 405 and the driven roller 408 parallel with each other.

As illustrated in FIG. 3B, the module front plate 412 and the module rear plate 413 are fixed respectively to the drying device front plate 311 and the drying device rear plate 312. The drying device front plate 311 and the drying device rear plate 312 stand on the drying device housing bottom plate 313. The module front plate 412 of the belt module 400*a* is fixed to the drying device front plate 311 by a front holding member 450 as a holding member. The front holding member 450 is detachably attached to the module front plate 412.

When the belt module 400*a* is assembled into the housing of the drying device 3), the belt module 400*a* is assembled in the direction indicated by the arrow B, that is, in the direction from the front side toward the rear side in the interval direction between the drying device front plate 311 and the drying device rear plate 312. The interval direction is a direction perpendicular to the drying device front plate 311 and the drying device rear plate 312. In other words, in the assembly of the belt module 400*a*, the engagement positions of the holding member 450 with the module front plate 412 and the engagement positions of the holding member 450 with the drying device front plate 311 are engaged with each other from the same direction in the interval direction between the module front plate 412 and the module rear plate 413.

The front holding member 450 is engaged with the module front plate 412 and the drying device front plate 311 when the module rear plate 413 is attached to the drying device rear plate 312 for assembly. The engagement portion of the front holding member 450 with the module front plate 412 and the engagement portion with the drying device front plate 311 are engaged with the corresponding engagement portions of the module rear plate 413 and the drying device rear plate 312 by an attachment operation from the direction of arrow B for assembly. The direction of the arrow B is also a direction from the front side toward the back side in the axial direction of the rollers between the pair of side plates on the belt module 400*a*.

Figure 4A:
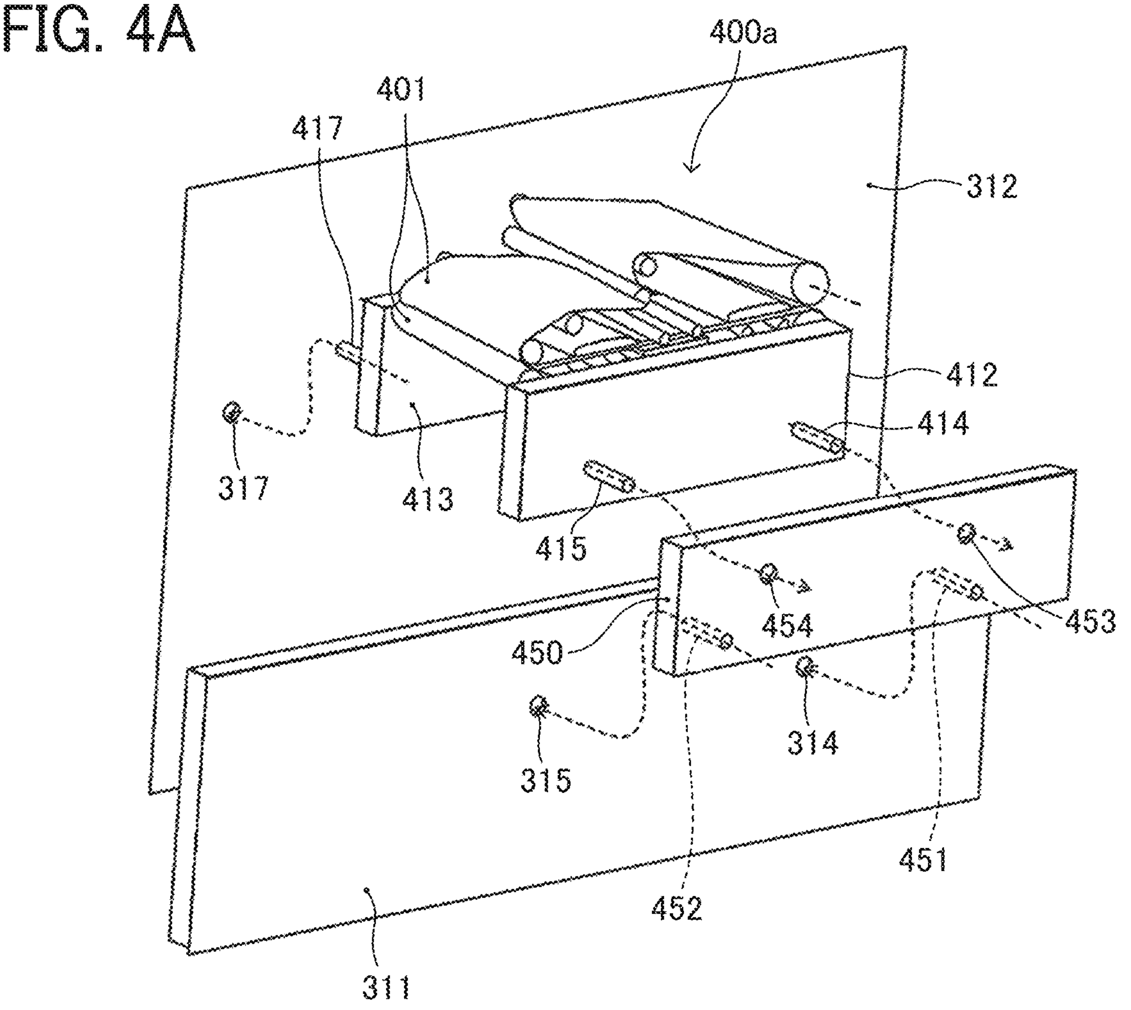
FIGS. 4A and 4B are diagrams, each illustrating a comparative fixing method of how the belt module is fixed to a drying device.
Figure 4B:
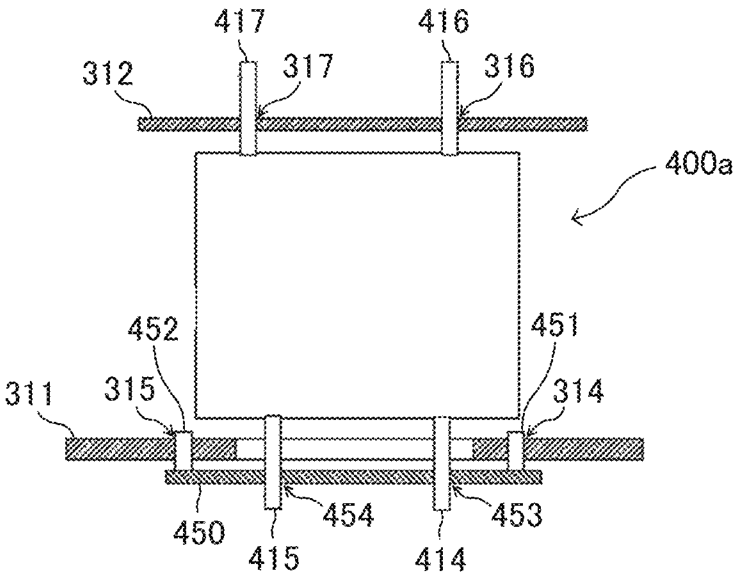

FIGS. 4A and 4B are diagrams, each illustrating a comparative basic fixing method of how the belt module 400*a* is fixed to the drying device 3).

FIGS. 4A and 4B illustrate details of the attachment portion of the drying device as a device to incorporate the module.

FIG. 4A is a perspective view of the belt module 400*a*, and FIG. 4B is a plan view of the belt module 400*a*.

The belt module 400*a* is supported at four points by the drying device front plate 311 and the drying device rear plate 312. Two positioning pins protrude from the inner surfaces of the drying device front plate 311 and the drying device rear plate 312, with the inner surfaces facing the belt module 400*a*, to the outer surfaces of the drying device front plate 311 and the drying device rear plate 312, with the outer surfaces facing the front and back sides. These pins are referred to as a module front right pin 414, a module front left pin 415, a module rear right pin 416, and a module rear left pin 417. Holes 316, 317, 453, and 454 are formed in the drying device rear plate 312 and the front holding member 450 so that the pins are attached, as illustrated in FIG. 4B. The shapes of the holes 316, 317, 453, and 454 may not be circular. The pins and holes may be formed opposite of the illustrated example. For example, the positions of the pins and holes in FIG. 4B may be exchanged. That is, the pins may be attached on the drying device rear plate 312 and the front holding member 450, and the holes may be formed in the belt module 400*a*.

A front holding positioning right pin 451 and a front holding positioning left pin 452 are attached on the front holding member 450. A hole 314 and a hole 315 for attaching the front holding positioning right pin 451 and the front holding positioning left pin 452, respectively, are formed on the drying device front plate 311. If the belt module 400*a* is completely fixed, the belt module 400*a* is twisted due to the distortion of the drying device housing or the deviation of the hole position. The position of the belt deviates from the value confirmed with the belt module alone. In particular, it is considered that the "twisting" caused by moving up and down one of the four fixed points largely causes the belt deviation. Especially, since the belt module 400*a* includes multiple belts on the top and bottom as illustrated in FIG. 3A, the twisting affects the upper and lower belts of the belt module 400*a*.

Generally, when an endless belt is driven, the endless belt meanders. In order to solve this problem, a mechanism that automatically corrects the belt deviation is provided. However, since a large belt deviation may not be adjusted by the automatic adjustment mechanism alone, the belt deviation is kept within a certain deviation amount range in the process. However, when the adjusted module is mounted on, for example, the housing of the drying device 300 after assembly, distortion occurs in the module due to slight deviation of the positioning pin, resulting in belt deviation. Especially when replacing the belt in the market, delicate belt deviation adjustment is performed on site. In an embodiment for solving such a problem, the following attachment mechanism is used as an attachment mechanism to attach one module side plate of a pair of side plates of a module to a main body side plate of an apparatus in which the module is incorporated. That is, the attachment mechanism includes holding members (for example, the front holding member 450 and an adjustment holding member 460) that hold one device side plate (for example, the module front plate 412), so that the posture of the one device side plate with respect to the main body side plate (for example, the drying device front plate 311) is adjusted with the holding member when the module is assembled.

Figure 5:
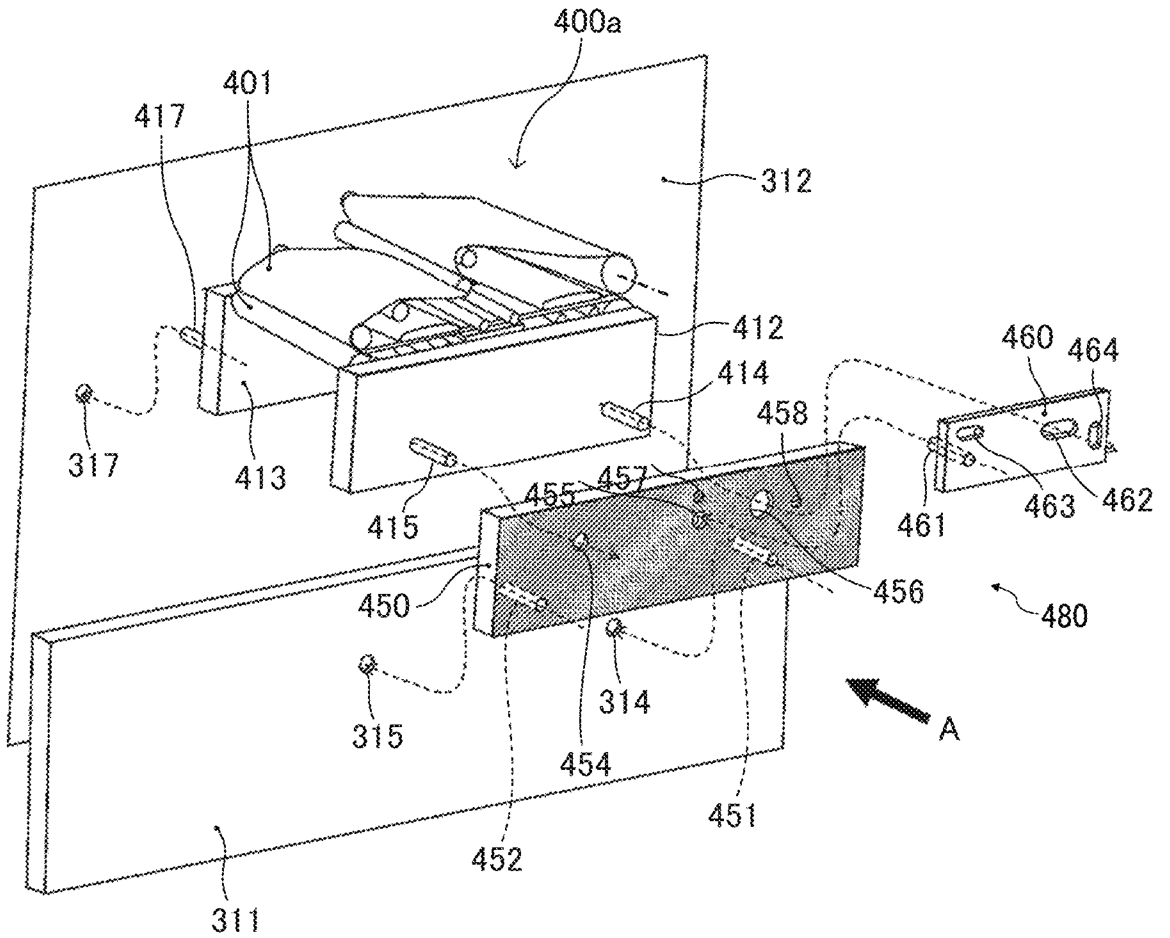
FIG. 5 is a diagram illustrating a fixing method using a belt deviation adjustment mechanism as an attachment mechanism according to an embodiment of the present disclosure.

FIG. 5 is a diagram illustrating a fixing method using a belt deviation adjustment mechanism 480 as an attachment mechanism according to an embodiment of the present disclosure.

In order to avoid being affected by the above-described distortion of the drying device housing, a mechanism is provided to adjust the hole position of the drying device housing (main body) with respect to the belt module 400*a* as illustrated in FIG. 5. The module front right pin 414 attached on the module front plate 412 is changed to be fixed to an adjustment holding member 460 provided separately. The adjustment holding member 460 is rotatable around the rotation center axis 461. Further, the adjustment holding member 460 may be fixed to the front holding member 450 at any angle by, for example, a screw.

The adjustment holding member 460 has an insertion slot 462 for fixing the module front right pin 414, a horizontal slot 463 through which the screw shaft passes, and a vertical slot 464 through which the screw shaft passes. A relatively large through hole 456 is formed in the front holding member 450 at a position facing the module front right pin 414. The front holding member 450 has a hole 455 into which the rotation center axis 461 of the adjustment holding member 460 is inserted and two screw holes 457 and 458 are also formed for fixing.

Figure 6A:
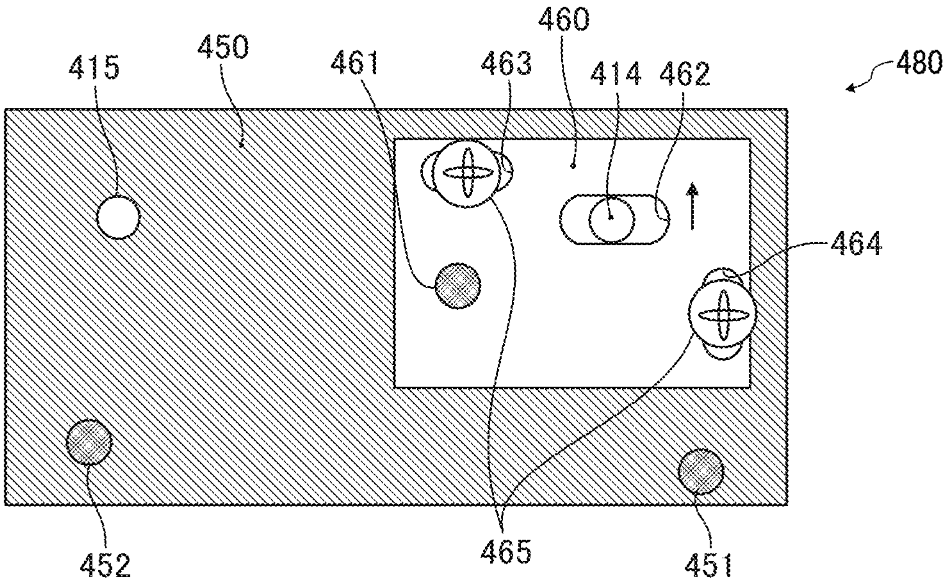
FIGS. 6A and 6B are diagrams, each illustrating an adjustment method using the belt deviation adjustment mechanism.
Figure 6B:
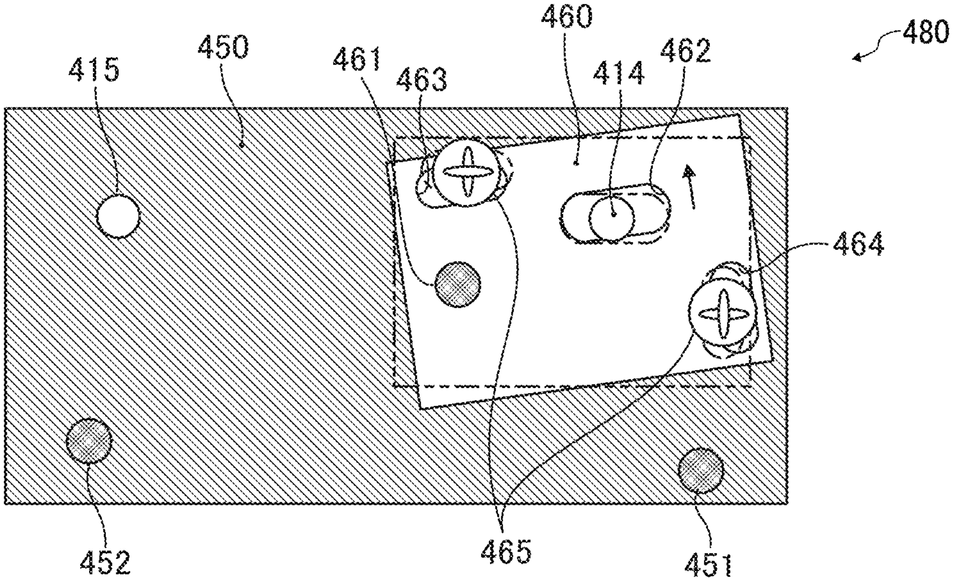

FIGS. 6A and 6B are diagrams, each illustrating the adjustment method using the belt deviation adjustment mechanism 480, viewed from A in FIG. 5.

FIG. 6A illustrates a state in which the adjustment holding member 460 is not inclined with respect to the front holding member 450.

FIG. 6B illustrates a state in which the adjustment holding member 460 is inclined with respect to the front holding member 450.

As illustrated in FIG. 6B, by rotating the adjustment holding member 460, the insertion slot 462 for fixing the module front right pin 414 moves upward (arrow direction).

As illustrated in FIG. 6, the fixing hole of the module front right pin 414 of the four positioning pins 414, 415, 416 and 417 on the belt module 400*a* is moved. As a result, the front surface of the belt module 400*a* is twisted with respect to the back surface of the belt module 400*a*. Twisting causes misalignment between the rollers of the belt module 400*a*. By reproducing the alignment between the rollers of the belt module 400*a* in the assembly process, the belt deviation amount is adjusted to the amount of the belt module 400*a* adjusted as single unit before shipment. The adjustment holding member 460 is fixed to the front holding member 450 by a screw 465. Due to such a configuration, when the belt module 400*a* is removed for maintenance or for the other reasons, the belt module 400*a* is returned to the adjustment position before removing unless the screw 465 is removed. The fixed position of the adjustment holding member 640 with respect to the front holding member 450 represents the adjustment amount, and the adjustment amount is recorded by fixing with the screw 465.

In the examples illustrated in FIGS. 5, 6A, and 6B, the module side plate is engaged with the holding member at two positions, the holding member is engaged with the main body side plate at two positions, and the position of the engaging portion at one position of the module side plate in the holding member is adjusted during assembly. Instead of the position of the one engagement portion of the module side plate in the holding member, the position of the one engagement portion of the holding member with the main body side plate in the main body side plate may be adjustable during assembly. According to the same principle in the example illustrated in FIGS. 5 and 6, the present embodiment is implemented by moving either the front holding positioning right pin 451 or the front holding positioning left pin 452 instead of the positioning pins 414, 415, 416, and 417 on the belt module 400*a*.

Figure 7:
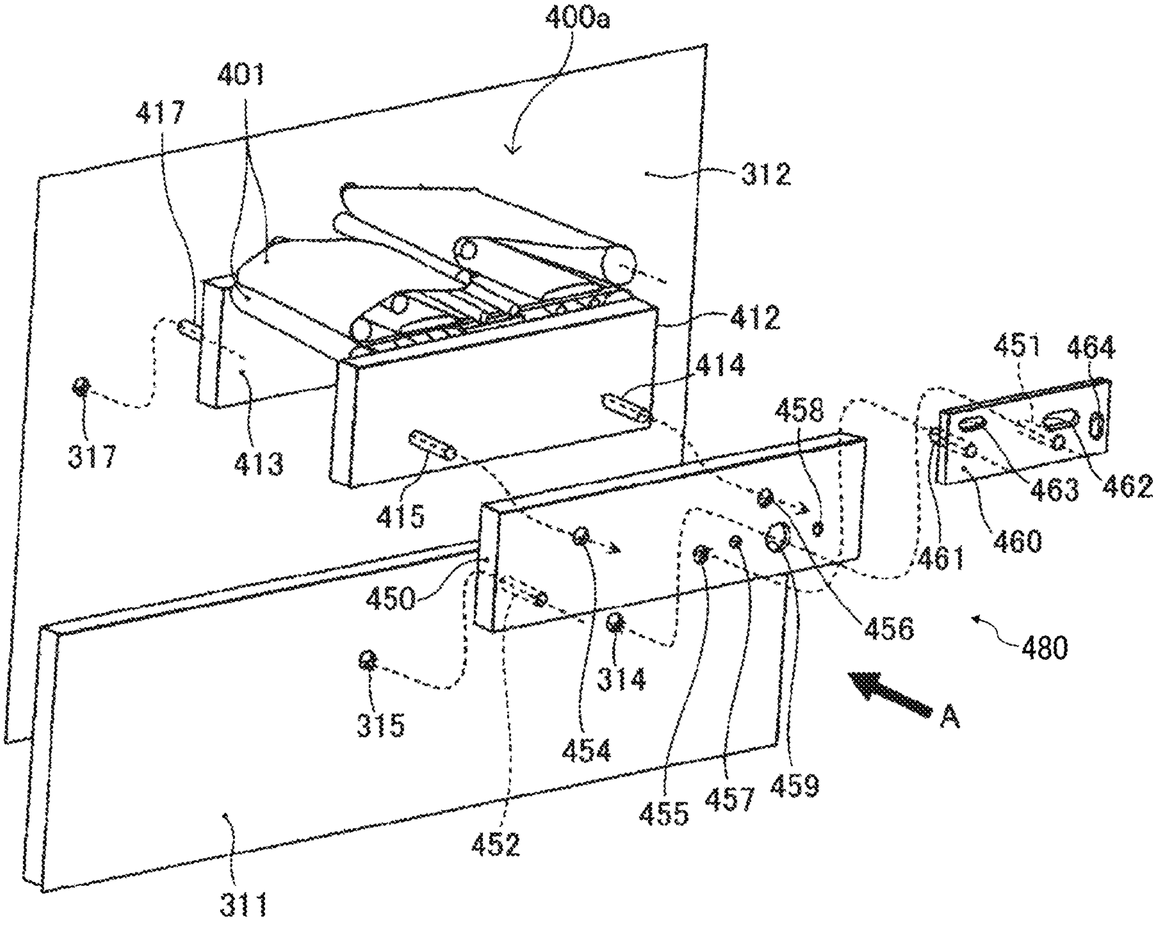
FIG. 7 is a diagram illustrating a fixing method using a belt deviation adjustment mechanism according to a modification of the embodiment of FIG. 5.

FIG. 7 is a diagram illustrating the fixing method using the belt deviation adjustment mechanism 480 according to a modification of the present embodiment.

In the configuration illustrated in FIG. 7, the front holding positioning right pin 451 is movable. The front holding positioning right pin 451 is provided on the adjustment holding member 460 instead of the front holding member 450. The front holding member 450 has a through hole 459 having such a size that the front holding positioning right pin 451 moves along with rotation of the adjustment holding member 460. The front holding and positioning right pin 451 passes through the through hole 459 and is inserted into the hole 314 for attachment of the drying device front plate 311. The through hole 456 of the front holding member 450 into which the module front right pin 414 is inserted, illustrated in FIG. 7, is different from the through hole 456 in FIGS. 5, 6A, and 6B. The through hole 456 illustrated in FIG. 7 is formed according to the diameter of the pin. In the case where the module front right pin 414 has a length such that the distal end extends through the through hole 456 to reach the adjustment holding member 460, the insertion slot 462 of the adjustment holding member 460 into which the distal end of the module front right pin 414 is inserted is formed into a large hole so that the adjustment holding member 460 smoothly rotates.

In this example, the belt module 400*a* is completely fixed to the front holding member 450. When the front holding member 450 moves, the belt module 400*a* moves along with the front holding member 450. Since the adjustment holding member 460 is fixed to the front holding member 450, even when the belt module 400*a* is removed, the belt module 400*a* is returned to the original adjustment position unless the fixing is removed.

Figure 8A:
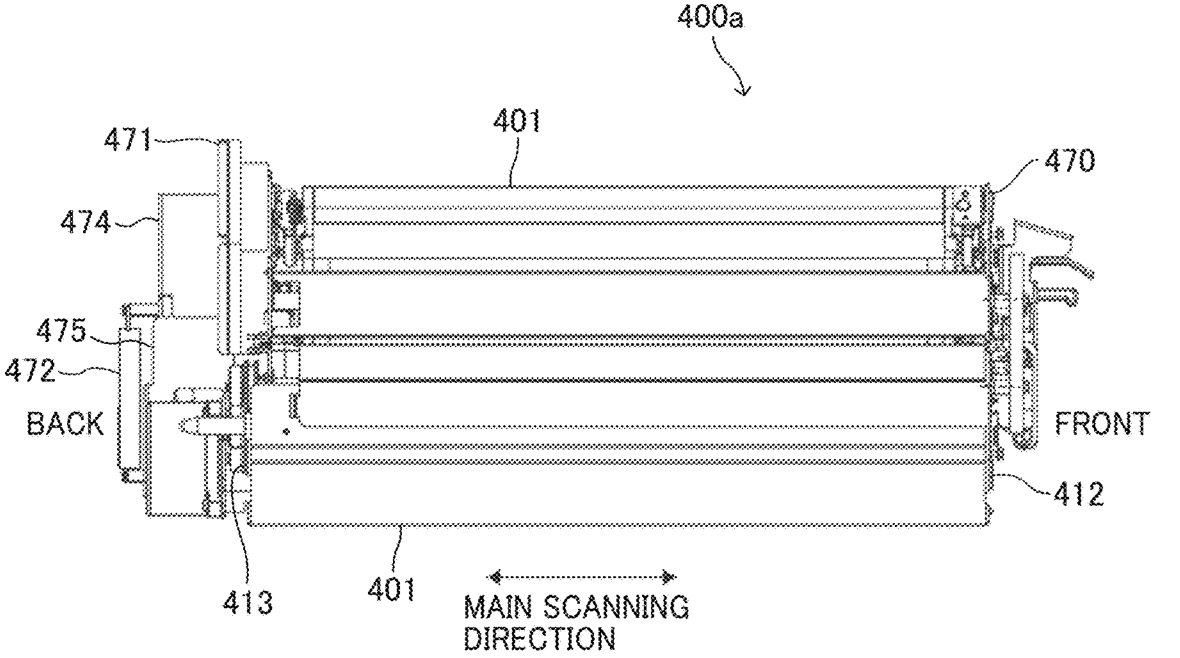
FIGS. 8A and 8B are diagrams, each illustrating an open-close structure of the belt module.
Figure 8B:
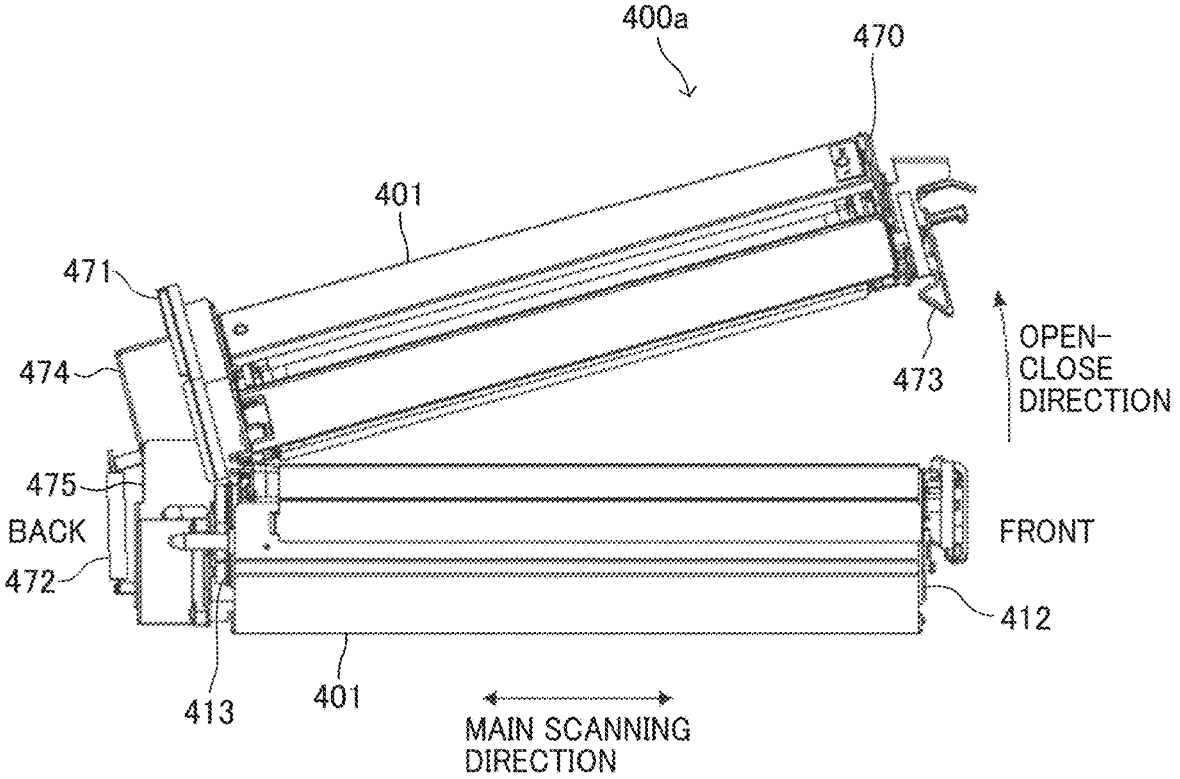

FIGS. 8A and 8B are diagrams, each illustrating the open-close structure of the belt module 400*a*.

The upper conveyance belt 401 includes a front side plate 470 and a rear side plate 471 that support both ends of the driving roller 405, the driven roller 408, and the cooling unit 402. A bracket 474 is fixed to the rear side plate 471. A bracket 475 is fixed to the module rear plate 413 of the lower conveyance belt 401. As illustrated in FIG. 8B, the bracket 474, for example, configures a rotation fulcrum at which the front side plate 470 of the upper conveyance belt 401 moves upward away from or moves toward the module front plate 412 of the lower conveyance belt 401. A tension spring 472 is disposed between the bracket 474 and the bracket 475. The front side plate 470 of the upper conveyance belt 401 includes a lock claw 473 that restricts the upward movement of the front side plate 470 against the force of the tension spring 472.

The above-described embodiment relates to a belt device provided in a conveyance device or a cooling device of a printing apparatus but may be applied to a belt device used in another apparatus. Further, the above-described embodiment is applied not only to the belt device but also to an apparatus that needs to ensure parallelism of a pair of side plates. The belt device may be provided with a unit that measures the belt deviation speed and a display unit that displays the measurement result of the belt deviation speed. According to this configuration, the belt device adjusts the position of the belts while confirming the belt deviation speed.

Figure 9A:
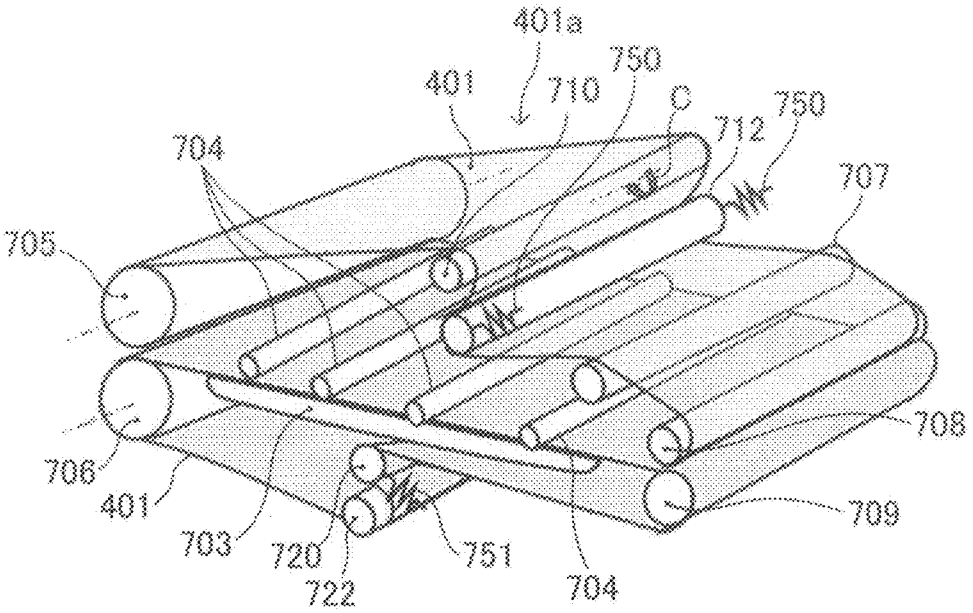
FIGS. 9A and 9B are diagrams, each illustrating another example of the belt module.
Figure 9B:
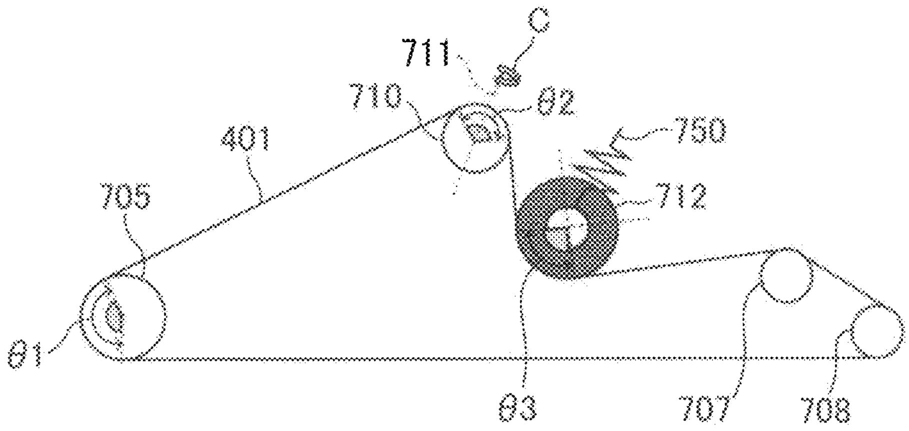

FIGS. 9A and 9B are diagrams illustrating another example of the belt module 400*a*.

FIG. 9A is a perspective view of another example of the belt module 400*a*, and FIG. 9B is a cross-sectional view of an upper conveyance roller unit of the belt module 400*a*.

The belt module 400*a* included in the cooling device 400 of the inkjet image forming apparatus 1 that performs high speed printing as illustrated in FIG. 1 is required to have a highly efficient cooling system in order to decrease the temperature of the sheet printed at high speed, to a temperature at which the sheet is stackable. Immediately after the sheet is dried by the drying mechanism 301 of the inkjet image forming apparatus 1 in FIG. 1, the sheet is likely to have an image defect when conveyed by rollers, and it is difficult to bring the rollers into contact with the sheet.

Since the sheet is conveyed while being nipped between the upper and lower conveyance belt 401, the belt module 400*a* illustrated in FIGS. 9A and 9B less likely cause an image defect. In addition, the sheet is pressed against the cooled cooling plate 703 by the plurality of pressure rollers 704, and the sheet is cooled by contact heat transfer. Since cooling is performed by contact heat transfer, more efficient cooling is achieved. At the same time, by pressing against the driving belt, the belt's friction provides the conveyance function. Liquid flows inside the cooling plate 703, and cooling is performed by cooling the liquid at a high heat transfer rate, but the cooling method is not limited to liquid cooling. The upper and lower conveyance belts 401 are supported by a plurality of rollers 705, 706, 707, 708, 709, 710, 712, 720 and 722. In FIG. 9A, the conveying force is applied by the driving roller 705 and 706, but the function and arrangement of each are not limited.

The winding method of the tension roller and the tension method of the belt of the belt module 400*a* illustrated in FIGS. 9A and 9B are devised to achieve both a sufficient belt deviation correcting force and the precise control of the belt deviation. Hereinafter, a detailed description is given of this point. A method of tilting one of the tension rollers (hereinafter the tilted roller is referred to as the steering roller) is known to control belt meandering. This steering roller automatically controls the angle of rotation around a predetermined rotation axis when belt deviation is detected by a known belt deviation detector.

There are two methods for tilting the steering roller. One is Method A in which the belt is tilted by being rotated about an axis perpendicular to the steering roller in a plane perpendicular to the tension direction of the belt. In this method, since the amount of deviation of the belt is not proportional to the rotation angle, there is a concern that the control becomes complicated and the tension becomes non-uniform on the right and left sides of the belt, thereby affecting the sheet conveyance. The other is Method B includes a method of rotating the steering roller around an axis parallel to the tension direction of the belt. In this method, the belt deviation is caused by the same amount according to the angle of rotation. However, only about one third of the belt deviation is restrained with respect to the same tilting angle. Table 1 below indicates a comparison between the two methods.

TABLE 1

| Roller rotation direction to control belt deviation | Rotation around an axis parallel to the direction of tension | Rotation around an axis in the plane perpendicular to the direction of tension |
|---|---|---|
| Tension variation in the belt width direction | Not likely to occur | Likely to occur |
| Linearity of sensitivity to tilt | Wide range of linearity | Short range of linearity |
| Sensitivity to belt deviation | Low | High |

With respect to the meandering control of the belt conveying device, there are following requirements in general. For example, in a printing apparatus in which a sheet is conveyed by upper and lower belts, a slight belt deviation may cause a large deviation by a conveying length and an image defect may occur. In order to avoid the problem, such a printing apparatus requires finer belt deviation control. In addition, in the case of a configuration in wbich the conveying surface occupies a large area during belt conveyance, disturbance due to sheet conveyance is also large, and a force for correcting belt deviation is also required. For these reasons, the method for restraining the meandering requires compatibility between the belt deviation correcting force and the fine control. However, the known method such as Method B is insufficient to fulfill the requirements.

In the belt module 400*a* illustrated in FIG. 9B, the upper steering roller 710 is rotated as indicated by an arrow C around a rotation center 711 which is parallel to the tension direction. Rotation of the upper steering roller 710 in this direction achieves more precise control. The rotation axis is preferably positioned at the center in the width direction of the roller, but may not be positioned at the center, as long as the roller is tilted. By increasing the winding angle of the belt around the steering roller, the sensitivity to the belt deviation is increased, and the belt deviation is restrained finely. The sensitivity to the belt deviation is increased by increasing the winding angle of the steering roller. The optimal winding angle of the steering roller is about 60 degrees.

In addition, among the tension rollers, a roller (hereinafter referred to as a tension adjusting roller) that equalizes the tension in the belt width direction is required. In the illustrated example in FIGS. 9A and 9B, force in the belt tensioning direction is applied to the upper tension adjusting roller 712, for example, by a spring 750, to provide a constant tension in the belt width direction. Even when the upper tension adjusting roller 712 moves so as to tilt, the belt deviation is also affected. When the upper steering roller 710 rotates, the upper tension adjusting roller 712 also moves in order to keep the belt tension in the belt width direction constant. In this operation, the upper tension adjusting roller 712 also causes the belt deviation.

When the winding angle θ3 of the upper tension adjusting roller 712 is made as small as possible, the sensitivity of the upper steering roller 710 is reduced. The winding angle θ3 of the upper tension adjusting roller 712 is made smaller than the winding angle θ2 of the upper steering roller 710. In FIG. 9B, the upper tension adjusting roller 712 is pressed from the belt outer side toward the belt inner side to apply tension in order to secure the winding angle θ2 of the upper steering roller 710. Alternatively, the upper tension adjusting roller 712 may be pressed from the belt inner side toward the belt outer side.

The winding angle θ1 of the belt of the driving roller 705 for applying the conveyance force is the largest winding angle among the rollers. The upper steering roller 710 has the second winding angle θ2 that is the second largest winding angle. The diameter of the upper tension adjusting roller 712 is larger than the diameter of the upper steering roller 710. The winding angle of the upper tension adjusting roller 712 decreases as the diameter of the upper tension adjusting roller 712 increases.

The same configuration may be applied to the lower conveyance belt 401. That is, the lower steering roller 720 and the lower tension adjusting roller 722 have the same configurations as the upper steering roller 710 and the upper tension adjusting roller 712. A spring 751 illustrated in FIG. 9A biases the lower tension adjusting roller 722.

Figure 10A:
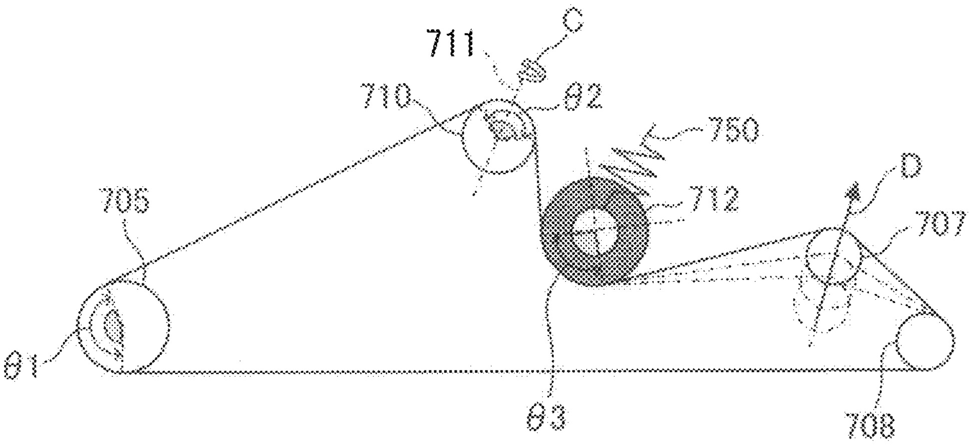
FIGS. 10A and 10B are diagrams, each illustrating a modified example of the belt module.
Figure 10B:
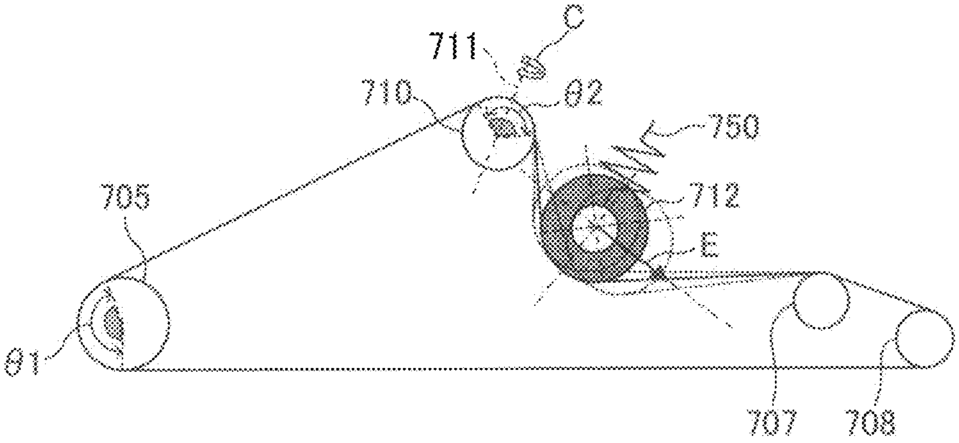

FIGS. 10A and 10B are diagrams, each illustrating a modified example.

FIGS. 10A and 10B illustrate respective modified examples different from each other.

Each of these modified examples includes a manual belt deviation adjustment mechanism in addition to the meandering control mechanism illustrated in FIGS. 9A and 9B. In the case where a large number of rollers are tensioned, when the belt deviation further increases, it may be difficult to control the belt deviation by the upper steering roller 710 alone. Belt deviation which is not sufficiently adjustable by the steering roller tilt adjustment mechanism is made adjustable at the unit assembly process stage or during parts replacement. The manual belt deviation adjustment mechanism is employed in addition to or instead of the belt deviation adjustment mechanism of the belt module described with reference to FIGS. 3A to 8B.

FIG. 10A illustrates an example in which the entrance roller 707 is moved in the adjustment direction D. In FIG. 10A, the roller is tilted by moving the front side of the entrance roller 707 in the direction of the arrow D which is the belt tensioning direction. Thus, an alignment adjustment mechanism is provided to tilt the roller. The roller is rotated and tilted around a rotational axis perpendicular to the roller axis in a plane perpendicular to the belt tension at the far side of the entrance roller 707.

The adjustment direction may not be the direction D, but the belt deviation adjustment amount is relatively large by setting the adjustment direction to the direction D as indicated in Table 1. When this method is used, the winding angle of the upper tension adjusting roller 712 is changed by absorbing the tension variation. However, since the winding angle θ3 is relatively small, the influence is reduced. The control method is to adjust the belt deviation in advance within a control range by the upper tension adjusting roller 712, and then to adjust other disturbances such as a temperature change, entry of a sheet, or a difference of a sheet type by the upper steering roller 710.

Such adjustment is achieved with other rollers. For example, as illustrated in FIG. 10B, the upper tension adjusting roller 712 is tilted by moving to the front side in the adjustment direction E. According to this method, the upper tension adjusting roller 712 alone is moved for adjustment, so that the belt deviation is adjusted easily.

The configuration of the belt module 400*a* described above with reference to FIGS. 9A, 9B, 10A and 10B may be applied to a belt module other than the belt module included in the cooling device 400 of the inkjet image forming apparatus 1 that performs printing at high speed, as illustrated in FIG. 1. Further, this configuration may also be applied to a belt device that does not include the belt deviation adjustment mechanism of the belt module described with reference to FIGS. 3A to 8B. Aspects of the present disclosure provide respective effects as follows.

Aspect A

A belt device includes a first endless belt, a second endless belt, driving rollers, driven rollers, a steering mechanism, and a tension adjusting roller. The first endless belt is supported by a plurality of rollers including the driving rollers and the driven rollers. The second endless belt is supported by a plurality of rollers including the driving rollers and the driven rollers, and contacts the first endless belt for a certain contact section. The first endless belt and the second endless belt are pressed in contact with each other in the contact section of the belt device to convey a sheet. The steering mechanism rotates at least one roller supporting the first endless belt and the second endless belt, around an axis parallel to the tension direction of the belt to adjust the belt deviation. The tension adjusting roller automatically moves in the belt tensioning direction and adjusts the tension in the belt width direction. The winding angle of the steering roller is the second largest after one roller that functions as a reference of the roller parallelism. According to this configuration, both a sufficient belt deviation correcting force and the precise control of the belt deviation are achieved.

Aspect B

In Aspect A, the tension adjusting roller is a roller that presses from the belt outer side toward the belt inner side. According to this configuration, the winding angle of the steering roller is increased by winding the tension adjusting roller from the belt outer side.

Aspect C

In Aspect A or Aspect B, at least one of the rollers with which the belt comes into contact immediately before or after the belt comes into contact with the steering roller is a roller that automatically moves in the belt tensioning direction to adjust the tension in the belt width direction. According to this configuration, since the tension adjusting roller is adjacent to the belt, the belt deviation response is good.

Aspect D

In any one of Aspects A to C, the belt device includes a detector that detects deviation of one or both of the first endless belt and the second endless belt, and automatically controls the rotation angle of the rotation roller. According to this configuration, the tilt of the belt deviation is automatically changed according to the position of the belt.

Aspect E

In any one of Aspects A to D, at least one roller alignment adjustment mechanism is provided as the manual belt deviation adjustment method. According to this configuration, the belt deviation that is not fully adjustable by the steering roller tilt adjustment mechanism is made adjustable at the unit assembly process stage or during parts replacement.

Aspect F

In Aspect E, the alignment adjustment mechanism by the manual roller is performed by a roller that automatically moves in the belt tensioning direction and adjusts the tension in the belt width direction. According to this configuration, the tension adjusting roller alone is moved for adjustment, so that the belt tension is adjusted easily.

Aspect G

In any one of Aspects A to F, at least one roller of the rollers supporting the belt are fixed to a pair of front and rear fixing members. The fixing members are supported at two or more support points on the front and rear sides of the housing, respectively. A mechanism to adjust the belt deviation by moving one or more support points in an arbitrary direction is provided, and the adjustment amount of the adjustment is recorded in the belt device. According to this configuration, the deviation of the belt due to the distortion of the belt device is adjustable. For example, the belt deviation that is not caused due to the alignment of the roller such as the distortion of the installation place of the housing is supported separately.

Aspect H

In any one of Aspects A to G, in the contact section between the first endless belt and the second endless belt, a contact member is provided on the belt inner side of any one of the belts, and the contact member slides on the belt inner side of the belt. The contact member has a unit that heats or cools the contact member. According to this configuration, the function of cooling or heating the conveyed material such as the sheet is added by heating or cooling the contact member.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention. Any one of the above-described operations may be performed in various other ways, for example, in an order different from the one described above.

What is claimed is:

1. An attachment mechanism comprising:

a first holding member configured to hold a device side plate of a belt device to attach a main body side plate of an apparatus in which the belt device is incorporated; and a second holding member configured to be fixed to the first holding member, the second holding member including a first engagement slot extending in a first direction and a second engagement slot extending in a second direction, the second direction being different from the first direction, and being configured to rotate about a rotation center axis, the first holding member and the second folding member being configured to adjust a posture of the device side plate with respect to the main body side plate in assembly of the belt device.

2. The attachment mechanism according to claim 1, wherein the device side plate is engaged with the first holding member at two engagement positions and the first holding member is engaged with the main body side plate at two engagement positions, and wherein at least one of the engagement positions of the device side plate with the first holding member and the engagement positions of the first holding member with the main body side plate is adjustable in the assembly of the belt device.

3. The attachment mechanism according to claim 1, wherein, in the assembly of the belt device, the first holding member is engaged with the device side plate and the main body side plate when another device side plate of the belt device is attached to another main body side plate of the apparatus.

4. The attachment mechanism according to claim 3, wherein, in the assembly of the belt device, the engagement positions of the first holding member with the device side plate and the engagement positions of the first holding member with the main body side plate are engaged with each other from the same direction in an interval direction between the device side plate and the another device side plate.

5. An apparatus comprising:

a belt device including a pair of device side plates; and the attachment mechanism according to claim 1, the attachment mechanism being configured to attach one of the pair of device side plates of the belt device to the main body side plate of the apparatus.

6. A belt device comprising:

an endless belt supported by a plurality of rollers;

a pair of device side plates; and the attachment mechanism according to claim 1, the attachment mechanism being configured to attach one of the pair of device side plates to a main body side plate.

7. The belt device according to claim 6, wherein the plurality of rollers includes a steering roller configured to rotate around an axis parallel to a tension direction of the endless belt and a tension roller configured to automatically move in the tension direction to adjust tension in a belt width direction, and wherein a winding angle of the steering roller between the endless belt is greater than a winding angle of the tension roller between the endless belt.

8. A conveyance device comprising the belt device according to claim 6, the belt device being configured to convey a sheet.

9. A cooling device comprising:

the belt device according to claim 6; and a cooling unit disposed inside a circulation path of an endless belt of the belt device.

10. A printing apparatus comprising at least one of:

a conveyance device configured to convey a sheet; and a cooling device configured to cool the sheet, wherein the conveyance device and the cooling device include the belt device according to claim 6.

11. The attachment mechanism according to claim 1, wherein the rotation center axis includes a pin which is insertable into the first holding member.

* * * * *